United States Patent
Pope (10) Patent No.: US 9,744,804 B2
(45) Date of Patent: Aug. 29, 2017

(54) MULTI-DIAMETER TIRE AND WHEEL ASSEMBLY FOR IMPROVED VEHICLE MILEAGE WITH PASSIVE TRANSFER BETWEEN TIRE DIAMETERS

(71) Applicant: Kendall W Pope, Napa, CA (US)

(72) Inventor: Kendall W Pope, Napa, CA (US)

( * ) Notice: Subject to any disclaimer, the term of this patent is extended or adjusted under 35 U.S.C. 154(b) by 0 days.

(21) Appl. No.: 13/998,353

(22) Filed: Oct. 21, 2013

(65) Prior Publication Data

US 2014/0117746 A1    May 1, 2014

Related U.S. Application Data

(63) Continuation-in-part of application No. 12/890,874, filed on Sep. 27, 2010, now abandoned.

(51) Int. Cl.
| | |
|---|---|
| *B60B 11/06* | (2006.01) |
| *B60B 15/26* | (2006.01) |
| *B60B 11/04* | (2006.01) |

(52) U.S. Cl.
CPC ............... *B60B 11/06* (2013.01); *B60B 11/04* (2013.01); *B60B 15/263* (2013.01); *B60B 2900/1212* (2013.01); *B60Y 2200/10* (2013.01); *Y02T 10/86* (2013.01)

(58) Field of Classification Search
CPC ......... B60B 11/00; B60B 11/02; B60B 11/04; B60B 11/06; B60L 15/26; B60L 315/263; B60L 15/266
USPC .................................................... 301/35.621
See application file for complete search history.

(56) References Cited

U.S. PATENT DOCUMENTS

| | | | | |
|---|---|---|---|---|
| 1,556,941 A | * | 10/1925 | Liddell | 152/413 |
| 1,643,379 A | * | 9/1927 | Hutchinson | 301/36.1 |
| 1,662,208 A | * | 3/1928 | Pounds | 152/329 |
| 1,896,803 A | * | 2/1933 | Sargent et al. | 301/6.7 |
| 1,998,415 A | * | 4/1935 | Booth | 301/36.3 |
| 2,054,225 A | * | 9/1936 | Lewis | 301/36.1 |
| 2,104,565 A | * | 1/1938 | Ludwick | 301/40.3 |
| 2,170,647 A | | 8/1939 | Ash | |
| 2,201,632 A | | 5/1940 | Roessel | |
| 2,241,849 A | | 5/1941 | Fuchs | |
| 2,254,318 A | | 9/1941 | Roessel | |
| 2,259,022 A | * | 10/1941 | Clark et al. | 301/36.1 |
| 2,416,862 A | * | 3/1947 | Baker | 301/13.1 |
| 2,751,959 A | * | 6/1956 | Blomquist | 152/416 |
| 2,765,199 A | | 10/1956 | Partin | |
| 3,463,213 A | | 8/1969 | Wade | |
| 4,070,066 A | | 1/1978 | Reppert | |
| 5,427,398 A | | 6/1995 | Weybrecht | |
| 5,788,335 A | * | 8/1998 | O'Brien | 301/45 |

(Continued)

FOREIGN PATENT DOCUMENTS

| | | | |
|---|---|---|---|
| DE | 29819195 U1 | * | 12/1999 |
| FR | 1066702 A | * | 6/1954 |
| JP | 58139802 A | | 8/1993 |

*Primary Examiner* — Kip T Kotter (57) ABSTRACT

The TTAssembly is a three tire and rim wheel assembly. The assembly consists of a large diameter center wheel with two identical smaller diameter wheels on the inboard and outboard sides respectively. The TTAssembly replaces the standard single rim single tire assemblies on a vehicle hub, maximizing gas mileage and the safety requirement of the vehicle. It also reduces maintenance costs and eliminates the need for a spare tire.

1 Claim, 7 Drawing Sheets

(56) References Cited

U.S. PATENT DOCUMENTS

| | | |
|---|---|---|
| 5,810,451 A | 9/1998 | O'Brien |
| 5,839,795 A | 11/1998 | Matsuda |
| 5,906,418 A * | 5/1999 | Cullen ................. 301/36.1 |
| 6,022,082 A * | 2/2000 | O'Brien ................. 301/45 |
| 6,044,883 A | 4/2000 | Noyes |
| 6,244,666 B1 * | 6/2001 | O'Brien ................. 301/45 |
| 6,615,888 B2 | 9/2003 | Elkow |
| 6,637,834 B2 | 10/2003 | Elkow |
| 6,733,088 B2 | 5/2004 | Elkow |
| 2003/0071513 A1 * | 4/2003 | Elkow ................. 301/13.1 |
| 2003/0071515 A1 * | 4/2003 | Elkow ................. 301/36.1 |

* cited by examiner

MULTI-DIAMETER TIRE AND WHEEL ASSEMBLY FOR IMPROVED VEHICLE MILEAGE WITH PASSIVE TRANSFER BETWEEN TIRE DIAMETERS

BACKGROUND OF THE INVENTION

1. Field of the Invention

The present invention was developed to safely reduce the rolling resistance of a vehicle, thereby increasing gas mileage. For this invention increasing gas mileage or miles per gallon will be used but in the case of electric vehicles one would substitute "increasing miles per charge".

Figure 5:
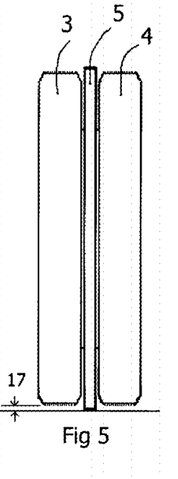
FIG. 5 is a front elevation view of the assembled invention
Figure 6:
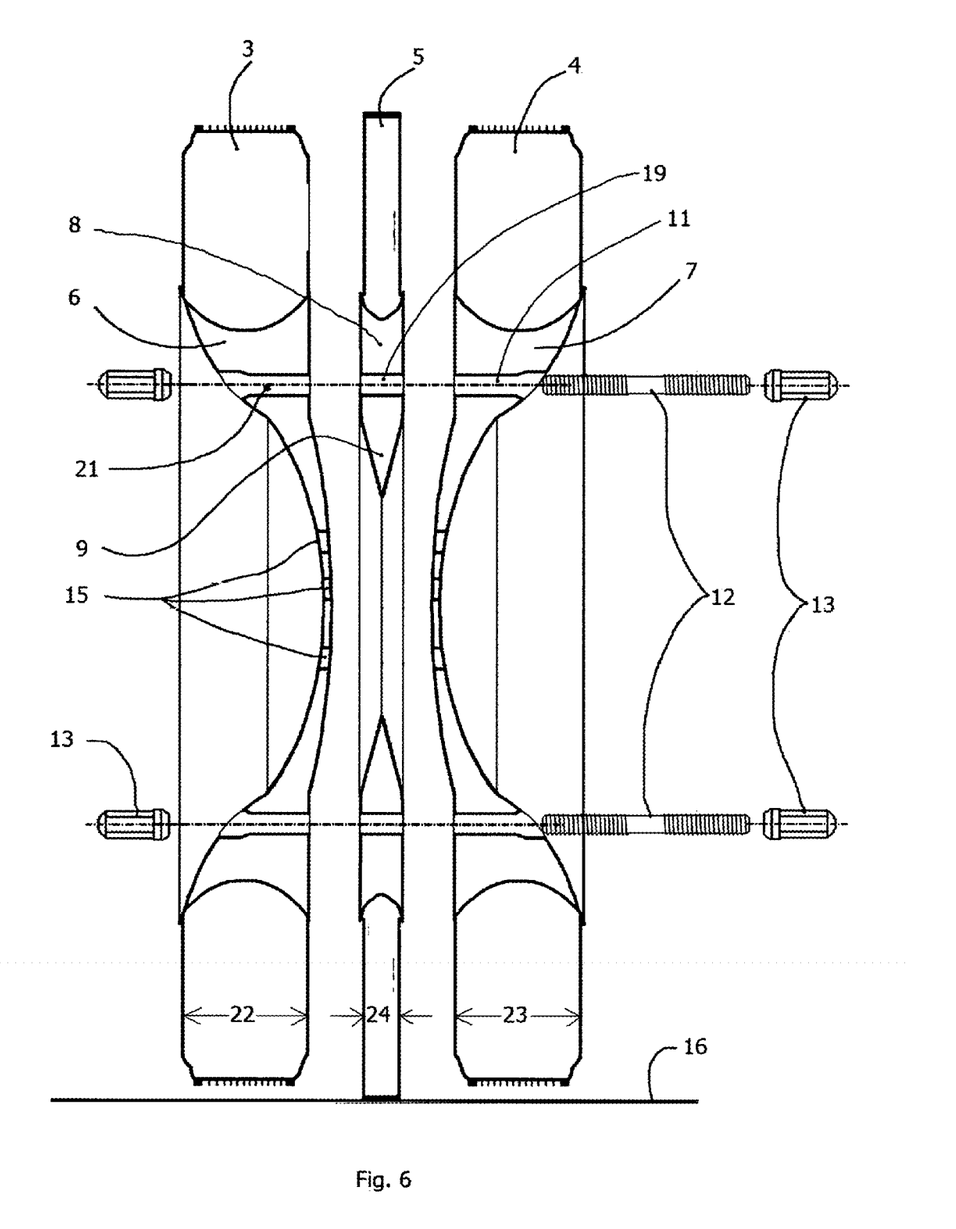
FIG. 6 is an exploded cross-sectional view of the invention showing identical small diameter rims.
Figure 8:
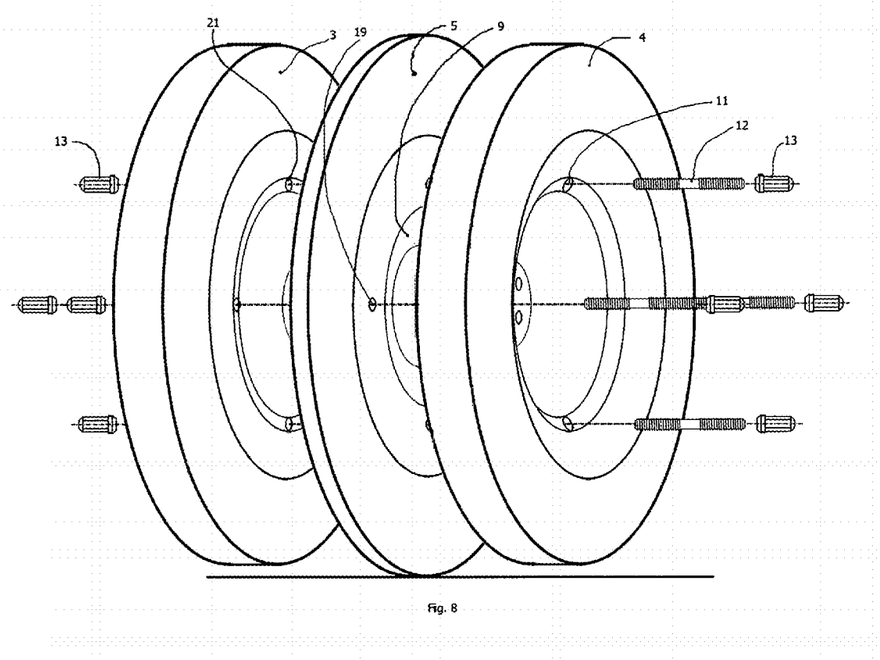
FIG. 8 is an exploded perspective view of the invention

The present invention relates to a pneumatic or gas-filled tire and wheel assembly for attachment to any and/or all hubs of a motor vehicle both front and rear. For the purposes of this invention, a tire that has been mounted on a rim is defined as a wheel. When the three wheels outlined in the invention have been assembled they are defined as the TTAssembly (Triple Tire Assembly). Each TTAssembly comprises two interchangeable small diameter wheels and one large diameter wheel. See FIG. 8. The two interchangeable small diameter wheels are mounted on each side of the large diameter wheel creating the TTAssembly. See FIG. 5.

Figure 9:
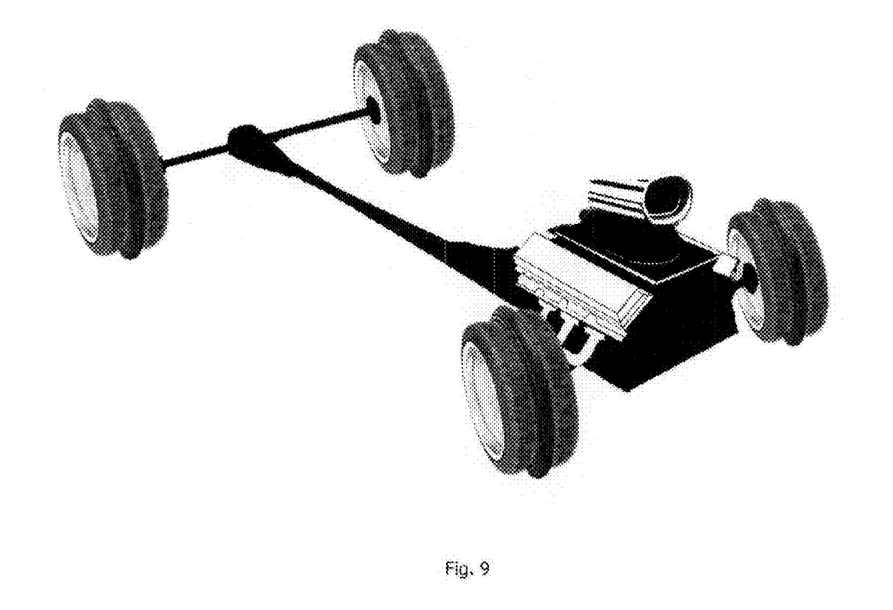
FIG. 9 is a view of the TTAssembly mounted on all 4 hubs of a vehicle

The TTAssembly must be mounted in pairs and would be mounted on each hub of the vehicle for maximum efficiency. See FIG. 9. The TTAssembly could also be mounted on just the front hubs of the vehicle, but the efficiency would be greatly reduced.

Since it is well known that narrower tires produce less rolling resistance and hence save gas, they are an obvious choice for the large diameter tire. It is also well known that the more tire surface area contacting the road, the more traction and support the vehicle will have. This makes for a safer driving experience, but will reduce gas mileage. It is also well known that a tire assembly with three separate air chambers is safer than a tire with two or one air chambers, thus this invention eliminates the need for a spare tire. While each individual choice above may seem obvious, developing a practical combined solution focused on increasing gas mileage while maximizing safety has eluded those knowledgeable in the subject for years. This invention is the perfect solution to maximize gas mileage and reduce cost while providing safety.

Figure 10:
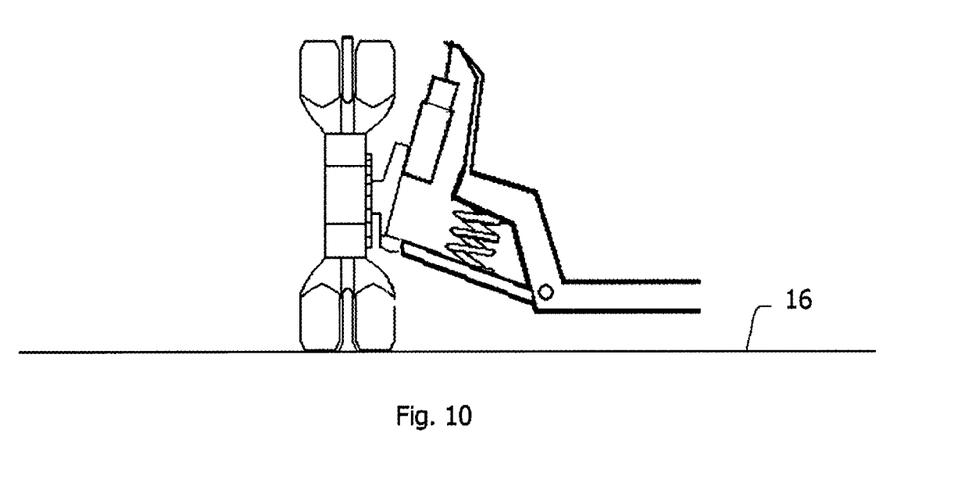
FIG. 10 is a cut away view showing TTAssembly during hard stop

The operation of the TTAssembly is uniquely simple. As the vehicle travels in a straight line, the large diameter wheel of the TTAssembly contacts the roadbed. The narrow footprint of the large diameter wheel maximizes the gas mileage. As the vehicle enters a turn, the TTAssemblies on the front of the vehicle are tilted either left or right due to a camber change of the vehicle. See FIG. 2. When the camber change is large enough it causes one of the small diameter wheels of each of the TTAssemblies on the front of the vehicle to contact the roadbed in addition to the large diameter wheel. This increases each TTAssemblies footprint on the roadbed making the turning of the vehicle safer. This transfer to the wider footprint occurs passively, without electronic, computer, or human-controlled mechanisms or pumps, and is seamless to the driver. If the vehicle weight is within its operating parameters and the tires selected are based on the manufacturers recommendations this passive transfer will be irrespective of the weight of the vehicle during normal operation. In panic or emergency stops all large diameter tires in the TTAssemblies will experience deformation, see FIG. 10, due to the braking forces on the front tires and braking forces on the rear tires. These braking forces are at the roadbed level. The inertia of the vehicle acting against the braking forces creates a rotating tendency, or torque, about the center of gravity of the vehicle. While the downward force on the front tires increases, the weight of the vehicle has not increased. In the case of a four wheel vehicle, that would put all twelve tires in the TTAssemblies in contact with the roadbed. Since it is well known that approximately 50% of the weight on the rear axle of the vehicle is transferred to the front tires during a hard stop, having the TTAssembly on all hubs of the vehicle is optimum.

The TTAssembly also offers a major benefit to the vehicle owner and the tire stores. Since the two smaller diameter wheels are interchangeable, it would be impossible to mount them on a vehicle incorrectly. Money would be saved because inventory could be reduced up to 60%, no spare tire is required, significant increase in miles per gallon is realized and there is reduced wear on the smaller diameter tires.

Additional benefits to the TTAssembly come in the form of types of tires that could be used. If snow tires were mounted on the inboard and outboard rims, the resulting ride would be much smoother and quieter than that of a regular snow tire during straight line driving. Chains could be mounted on the inboard and outboard tires and would not contact the road until the vehicle was turning or the snow was deep enough to contact the smaller diameter wheels. This would eliminate the daunting task of putting on chains in the snow. Four wheel drive or off-road vehicles could also use the TTAssembly. This would allow them to drive on paved roads to their destination and then drive off-road, like on sand dunes, where the wide or paddle-wheel or other fancy smaller diameter tires could come into contact with the surface. This would eliminate the need for trailering the vehicle or changing tires once the destination was reached. Military vehicles would benefit from reduced exposure to flat tires and could drive into non-paved areas without stopping to change tires. For sports cars, having the large diameter tire of the TTAssembly be the same width or even wider than the small diameter inboard and outboard tires might be appropriate in some instances. It would reduce gas consumption somewhat and eliminate the need for a spare tire in a typically miniscule trunk.

2. Description of Related Art

A high profile or narrow taller tire may be defined as a tire having a comparatively high aspect ratio, or height-to-width ratio, where the height is the distance measured radially from the tire's outer diameter to the rim opening or rim seat. A narrow, taller tire is preferred where fuel economy, low road noise, and ride quality are the main operational concerns. However, narrow taller tires do not have ideal handling characteristics in terms of steering, acceleration, and braking in aggressive driving conditions such as rainy conditions, sudden obstacles, or other condition where a large degree of safety or performance margin is required. A wider tire, also referred to as low profile or low aspect ratio, may be preferred for vehicles intended for high-performance handling, aggressive driving conditions or carrying heavy loads. However, wider tires or dual tires do not perform well in terms of fuel economy, road noise, ride quality, and tire wear. Tire selection typically involves compromise, sacrificing certain desirable performance characteristics for others such as performance or safety verses gas mileage. Vehicles such as family sedans or mini vans, which are mainly intended for comparatively sedate driving styles and straight-line highway driving, are typically fitted with softer riding taller tires with an aspect ratio of 70% to 80%. These narrower taller tires give them better gas mileage. Sports cars are commonly fitted with wider low aspect ratio tires in the 30% to 50% range. Trucks use dual tires on the rear wheels which are inherently wider to add stability, increase load capacity and improve traction and the like. Each of these compromises is acceptable when the vehicles in question are being operated according to their primary intended functions, but both suffer from significant drawbacks when operational conditions change. A vehicle riding on narrow taller tires requires slower speeds to navigate narrow, winding roads where tight cornering and hard braking may be required, especially when traction is poor due to rough, wet, or icy road surface conditions. In contrast, a vehicle with wider tires or dual rear tires generally handles much more responsively under such adverse conditions than if it had taller narrower tires, but it will give a rougher and noisier ride, with poorer fuel economy.

Prior art discloses numerous attempts to provide vehicle tire systems that use multiple-tire assemblies to adapt to different operating conditions. Elkow (U.S. Pat. No. 6,615,888) discloses a variable diameter wheel apparatus that uses a pump to inflate or deflate each tire independently to achieve optimum performance from a multiple tire arrangement. Sensors monitor selected operational parameters of the vehicle and transmits corresponding signals to a computer that selects an optimal tire configuration. Blomquist (U.S. Pat. No. 2,751,959) discloses a tire-and-wheel assembly having a selectively-inflatable auxiliary tire coaxially on a specialized telescoping rim and axle assembly, disposed between two conventional tires. The auxiliary tire has an accordion-like construction. The diameter of the auxiliary tire when un-inflated is less than that of the two conventional tires, so the auxiliary tire is not in contact with the road surface when it is un-inflated. When inflated, its diameter expands to match that of the conventional tires, and it also expands laterally, displacing the outboard conventional tire further outboard. Accordingly, inflation of the auxiliary tire greatly increases the total width of the wheel assembly and the total area of tire contact with the road surface, thereby providing improved traction. O'Brien (U.S. Pat. No. 5,788,335, U.S. Pat. No. 5,810,451, U.S. Pat. No. 6,022,082) discloses a studded, selectively inflatable auxiliary tire of specialized construction that is coaxially disposed between two conventional rear tires. As in Blomquist, the un-inflated diameter of the auxiliary tire in the O'Brien patents is less than that of the conventional tires. Upon inflation, the auxiliary tire expands in diameter, but does not expand laterally as in Blomquist, until it substantially matches the diameter of the conventional tires, such that the studs of the auxiliary tire may engage the road surface. The auxiliary tire thus must be manually inflated or deflated, to suit particular road conditions.

The inventions disclosed in the O'Brien patents cited above are directed primarily to providing rear wheel enhanced traction on slippery road surfaces, with the means for providing enhanced traction. This functionality is not passive. It requires the driver to stop and physically make changes to the vehicle to change from one state to another. It would be reckless to drive a vehicle on a clear dry road with the studs engaged. The studs would tear up the road until they were worn down, which would happen quickly, rendering the traction device useless. If the traction device is engaged, i.e. expanded to larger than the inboard and outboard wheels, the vehicle will still ride on all three wheels. O'Brien states "The tire 24 is expanded such that the studs 20 will extend beyond the diameter of the wheels 12, 14 to engage the supporting surface (roadway). The wheels 12, 14 still supports the vehicle weight and the tire 24 provides the traction." O'Brien's traction device is equivalent to adding chains to the outboard tire. It does not support any additional weight, requires a driver's interaction and will not increase gas mileage. Because the auxiliary tire is only used for traction and not for support, it would be obvious that the width of the auxiliary tire must be smaller than the width of the support tires as they are used for holding the side of the auxiliary tire. Otherwise the sidewall would buckle and traction would be non-existent. If the auxiliary tire were larger than the support tires the ability of the auxiliary tire to contract when not in use would compromise the ability to handle the torque required of a traction device.

The traction device rim outlined in the O'Brien patent has mounting holes that line up with the mounting lugs or bolts of the wheel housing. The additional thickness of the traction device rim, which allows for the mounting between two standard dual wheels, would require longer bolts from the hub. The rim would be custom for every configuration of dual wheels as the distance between the dual wheels is not consistent. In O'Brien's FIGS. 3, 5, 6 and 7 the rim is shown as flat. O'Brien's FIG. 5 shows that a spacer is used to allow enough space for the traction device to operate successfully. This traction device is not able to remove the heat build up from the traction device to allow it to operate at highway speeds, nor is it meant to. It is only good for providing studs, an alternative to chains that increase traction. Studded tires are allowed in 36 different states, and only between November 1st and March 31st. Alabama, Florida, Hawaii, Illinois, Louisiana, Mississippi, and Texas all ban studded tires completely. Revamping the studded to non-studded configuration while traveling in and out of these states would require a specialty tire service company and is not passive. The O'Brien patent would not work as the front tires of a vehicle. It requires the vehicle to have dual front tires with extended front axles to accommodate wheels with extreme positive offset that are expanded to fit the third tire in-between them. The additional cost of the tires, modifying the vehicle body as well as the strain on the vehicle components such as power steering and alignment components would not be feasible. On top of that, the turning radius of the vehicle quadruples making it almost impossible to drive except in a straight line.

Prior art discloses technology for increased traction and skid resistance on wet or icy roads while also addressing other objectives such as ride quality, fuel economy, or general handling characteristics. However, these attempts were different because they did not provide a safe tire assembly capable of travelling at highway speeds while delivering maximum fuel efficiency using tire assemblies with large and small diameter tires and a seamless, passive method of transfer between them.

Prior art discloses un-inflated or underinflated wheels that can be hazardous, can come loose from the rim, and get caught under one of the other functioning tires, creating a rollover situation. The designs add unnecessary weight, which decreases fuel efficiency, decreases braking ability, and could cause a rollover. If a pump fails, all four of the tires could be flattened, creating a crash prone scenario. If the computer, actuator, communication link, or any one of many sensors malfunctions, a life threatening condition arises. The central tire could expand as the vehicle goes around a sharp curve, removing all traction from the tires. The prior art involves complex traction mechanisms or tires of specialized construction with special sensors, computers, and pump configurations.

The Tawara patent (JP 58139802A) discloses a rear wheel assembly consisting of a two tire system with one large diameter tire and one small diameter tire. The purpose of the arrangement is to reduce wear on "double wheels for the rear wheels of a bus or the like" and as the weight of the vehicle increases, the smaller diameter tire contacts the road. The drawings for the Tawara patent show both rear wheels being the same width. Most prior art involves one or more conventional tires which are in load-bearing contact with the road surface at all times, regardless of whether the invention's particular traction enhancement or performance means are engaged, and regardless of the road conditions being travelled on. None of the prior art, except the Tawara patent provides a wheel/tire assembly that in itself provides a passive system that seamlessly transfers between large and small diameter tires at the precise instances or conditions required. The O'Brien patent requires that you stop and pump up or deflate the tire when conditions change. While Tawara does provide for passive transfer, it is based on changing the weight of the vehicle and will not change based on roadbed conditions, or vehicle direction change. In an emergency stop the Tawara patent becomes dangerous. Since it is the added weight in the vehicle that makes the second wheel contact the road surface, and since 50% or more of the weight is transferred to the front wheels in an emergency stop, the second wheel would be lifted off the ground reducing the frictional force on the rear wheels significantly increasing stopping distance. It cannot provide for optimum gas mileage. If the Tawara vehicle is lightly loaded, then it responds like a regular one wheel per hub vehicle. It would be obvious to one skilled in the art that a narrow tire on a high center of gravity vehicle, by itself, would be dangerous During a turn, the tall narrow tire would lower the friction side forces on the tire making a rollover more likely. This is especially true in a situation where narrow tires are used if the vehicle is top-heavy, such as a bus or a truck that would experience such stated vehicle weight increase that could deform Tawara's large diameter tire. It would be unsafe to operate with a high aspect ratio tire, therefore a wide tire would be required for the main roadbed-contacting rear wheels. Thus a significant gas savings cannot be achieved.

It would also be obvious to one skilled in the art that moving the Tawara patent idea to the front axle would be precluded. This is due to the fact that only one of the seldom used small diameter tires could contact the roadbed during a turn or obstacle avoidance maneuver causing a change in the tire width and frictional force on one side of the vehicle and not the other. This is also the case with the O'Brien patent as shown in his FIG. 6. This could result in a loss of control of the vehicle. This is often seen when a space-saver spare is used on one side of an axle, and is only condoned as a very reduced speed emergency tactic.

When the Tawara vehicle is loaded, both rear tires contact the road surface, giving more vehicle support and traction but completely eliminating any gas savings. This cannot be changed until the vehicle is unloaded.

Prior art also shows that most dual and triple wheel rims are focused on mounting dual wheels with enhancements in place of single wheels on the rear hubs of campers, light and heavy duty trucks for adding stability, increasing load capacity improving braking and traction and the like. These designs require heavy duty construction to accomplish the increase in load capacity and the wide track for added stability. Large heavy duty inner and outer rims with adaptors, sleeves, struts, baskets or cup like assemblies that allow access to inner rims are required to meet these expectations.

The solid rubber wheel (roue à bandage plein) described by Vaillant (FR 1066702A) in FIG. 3 could not be used on today's passenger cars where speeds of up to 80 MPH are attained. The diameter of the solid tire(s) would have to be at close to rim level to mitigate accidents while turning, meaning that it never contacts the road unless there is a flat tire. The width of the center tire in FIG. 3 can be larger than the inside and outside solid non-road contacting rubber wheels. It was designed to compensate for a flat tire where one could limp (less than 20 miles per hour) to a gas station to have it fixed. This is not an operational vehicle when the center tire is flat. He states that his invention protects the vehicle from projectiles that would impale a pneumatic tire. This was 1954, with large V8 engines where gas was cheap and horsepower was king. The leap from a device that must use solid rubber wheels to function as a "run flat" device located at or near the outside radius of the rim, to a device that requires pneumatic tires, that are in contact the road surface to increase gas mileage would not be predictable, but an accidental discovery, like vulcanization.

The TTAssembly invention is completely different. It is designed for all four vehicle hubs. Its main goal is not to carry additional weight or gain more traction but to safely increase miles per gallon. The invention is designed to replace a standard wheel, not require specially formed fenders or body parts to accommodate the additional width of a multiple tire system. The invention is fully reversible and could be bolted to the vehicle hub from either side. According to prior art, if the rims on a dual wheel system could be mounted in the reverse direction, the dual wheels would extend out further from the vehicle, thus producing undesirable performance characteristics.

BRIEF SUMMARY OF THE INVENTION

The present invention is assembled using three tires and three rims and mounting hardware for mounting on a motor vehicle hub as a replacement for a conventional single vehicle tire/rim assembly in order to safely maximize gas mileage. It requires no vehicle modifications and reduces costs. The invention includes an assembly of three coaxially mounted wheels: two small diameter wheels consisting of an inboard rim and an outboard rim each mounted with two identical small diameter tires, and one large diameter wheel consisting of one center V rim mounted with one large diameter tire. All three rims have the same diameter, while the tire diameters are different. The two small diameter wheels are located inboard and outboard of the assembly with the large diameter wheel located in the center. This assembly is called the TTAssembly (Triple Tire Assembly). The larger diameter tire will always be in contact with the road surface over which the vehicle is travelling.

Assuming the vehicle has four tires, at slow speeds or straight driving when rolling resistance is a large factor in determining gas mileage, the large diameter tires will be the only tires in contact with the road surface. This is the default condition. While turning, or other maneuverings, the inboard small diameter tire from one of the TTAssemblies on the front of the vehicle and the outboard from the other TTAssembly on the front of the vehicle will contact the roadbed in addition to the large diameter tire, yielding more surface area for the vehicle to ride on.

During a panic or emergency stop all of the large diameter tires in the TTAssemblies (both front and rear) will deform causing all of the tires to contact the roadbed. This is especially critical for the front assemblies as 50% of the rear axle weight is transferred to the front assemblies during a panic stop. As soon as the increased force is removed the large diameter tires will resume their previous shape and the vehicle will resume riding on only the large diameter tires. The vehicle will be most efficient when all hubs of the vehicle have the TTAssemblies installed on them. As is standard practice, each axle must have identical wheel assemblies.

Tires may be constructed of standard material already known in the art of tires. Rims are cylindrical and constructed of rigid material already known in the art of rims. Standard connecting hardware is used and is already known in the art.

DEFINITION LIST

Term Definition

1 Vertical axis of the vehicle perpendicular to the road surface (Camber Angle=0)
2 Vertical axis of the TTAssembly
3 Inboard small diameter tire
4 Outboard small diameter tire
5 Center large diameter tire
6 Inboard rim
7 Outboard rim
8 Center V rim
9 Center rim Wedge Tip
10 Threaded hole to accept stud
11 Thru-hole in rim with beveled edge to accept lug nut
12 Threaded Stud
13 Lug Nut that fits on Threaded Stud
14 TTAssembly
15 Mounting holes to fit wheel studs for vehicle hub
16 Roadbed surface
17 Difference in height between large diameter wheel and the small diameter wheels
18 The Camber Angle
19 Center large diameter rim mating hole
20 Optional inboard rim
21 Thru-hole in rim with beveled edge to accept lug nut
22 Width of inboard small diameter tire
23 Width of outboard small diameter tire
24 Width of center large diameter tire

DETAILED DESCRIPTION OF THE INVENTION

The invention includes an assembly of three coaxially mounted wheels so that the center of each tire and rim are aligned and each tire and rim are concentric around the longitudinal axis of the axle attached to the hub. This ensures that the TTAssembly rotates around the axle when properly attached to the hub. The TTAssembly is composed of: one inboard small diameter wheel consisting of one inboard rim 6 mounted with one inboard small diameter tire 3; one large diameter wheel consisting of one center V rim 8 mounted with one center large diameter tire 5; and one outboard small diameter wheel consisting of one outboard rim 7 mounted with one outboard small diameter tire 4. The two small diameter wheels are located inboard and outboard of the assembly with the large diameter wheel located in the center of the assembly.

The width of the inboard tire 22 and the outboard tire 23 are identical, whereas the width of the large diameter tire 24 can be smaller, equal to, or larger than the inboard 22 or outboard 23 tires.

Four threaded studs 12 and eight lug nuts 13 connect the TTAssembly together. Note that the inboard rim 6 and the outboard rim 7 are identical.

Connection is made by placing the threaded stud 12 through the outboard rim 7 thru-hole 11, through the center V rim 8 mating hole 19 and through the inboard rim 6 thru-hole 21.

Two lug nuts 13 are threaded onto each end of stud 12. This is duplicated for the remaining three studs and six lug nuts. Lug nuts are then tightened forcing the outboard rim 7 and the inboard rim 6 against the center rim wedge tip 9. The "V" shape on the center wedge tip 9 on the center V rim securely holds the three rims together while carrying heat away from the tire. All three rims, inboard, center V and outboard have the TTAssembly thru-holes evenly spaced around the rims and all thru-holes are equidistant from the center of the vehicle hub.

Figure 7:
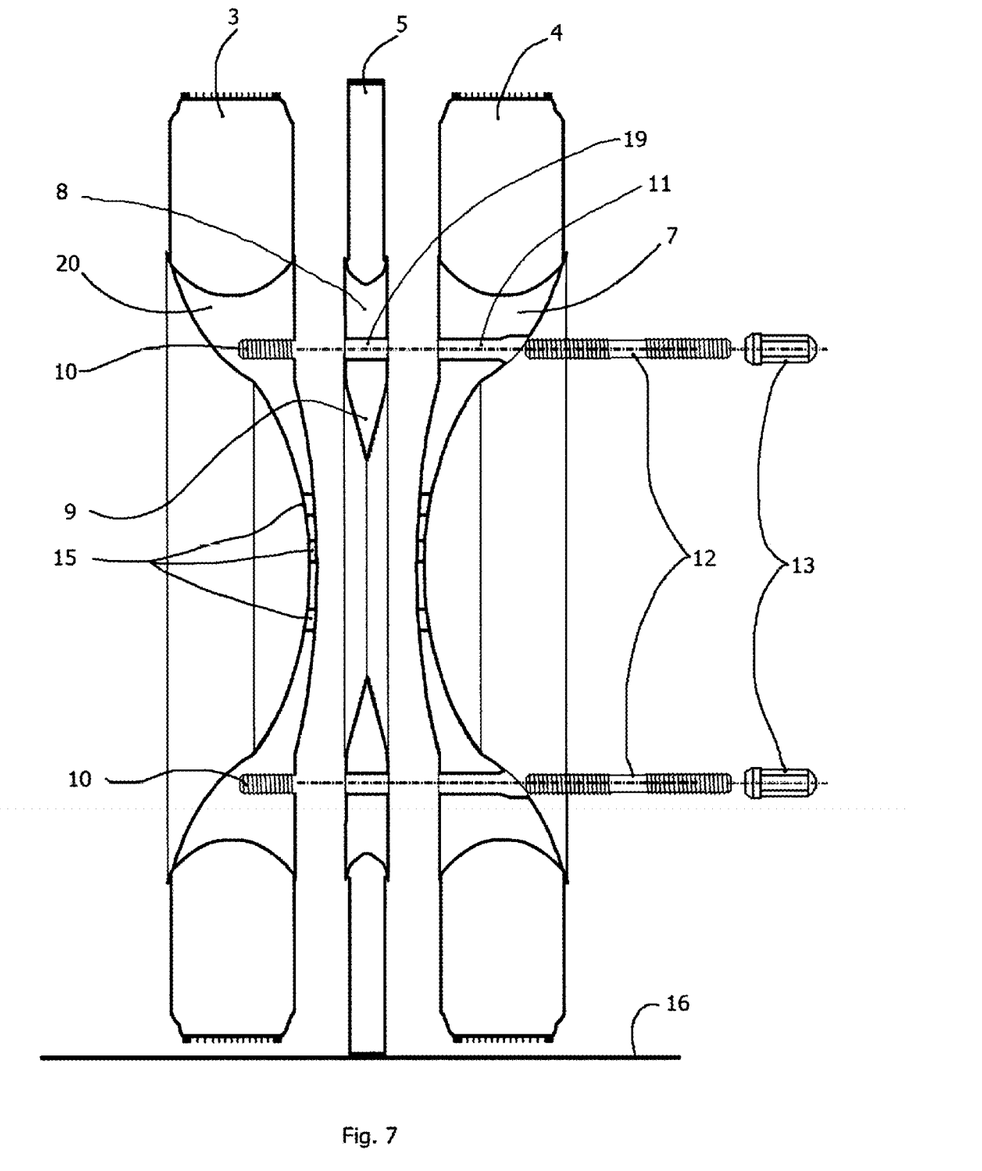
FIG. 7 is an exploded cross-sectional view of the invention showing the optional non-identical small diameter rims.

FIG. 7 shows an optional version where the inboard rim 20 has a threaded hole 10 to accept the stud 12, reducing the number of lug nuts 13 required.

All three TTAssembly rims have the same diameter and have a "standard" 4 bolt pattern in the upper portion of the rim regardless of the bolt pattern (4, 5, 6, 8, etc) on the vehicle hub. This reduces the inventory requirements by 80% and increases the potential for fast turnaround service.

The number of rims and tires used in the invention is the same. The TTAssembly may be mounted to a vehicle hub by any means. The standard means utilizes the existing threaded studs permanently attached to the vehicle hub where the TTAssembly is sandwiched between the vehicle hub and a lug nut securely tightened onto each stud.

The invention is easily modified to accept any sort of vehicle hub stud configuration 15. The center V rim 8 and the inboard 6 or 20 and outboard 7 rims may be manufactured in any of the current arts of rim making. In all cases, each tire has its own air chamber and pair of bead seals or other appropriate seals between rim and tire members required to contain gas in the tire chamber under high pressure. The design is modular where each rim is a separate component and the rim fastening means is reversible so that rims may be easily connected together and easily disconnected. In case of wear, weather or hazard the modular design of the invention allows for easy maintenance. The replacement of perhaps only one tire or wheel of the whole assembly can be accomplished without requiring replacement of any other component. This maintenance can be accomplished at a regular tire shop, vehicle repair shop, or home garage. This is a major cost savings. In addition, due to the fact that there are 3 air chambers in the TTAssembly per hub, a spare tire is not required, saving more money, weight and space.

Figure 1:
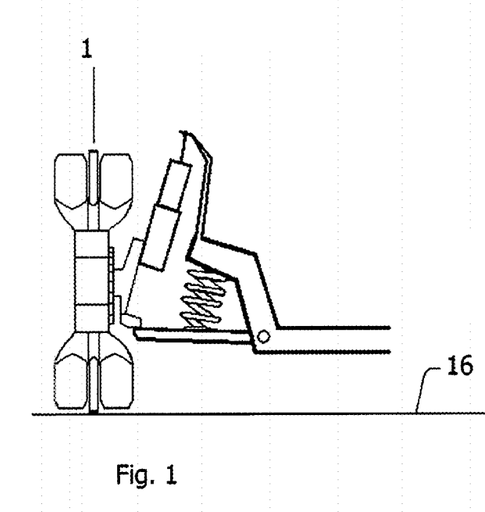
FIG. 1 is a cut-away view showing zero Camber Angle
Figure 2:
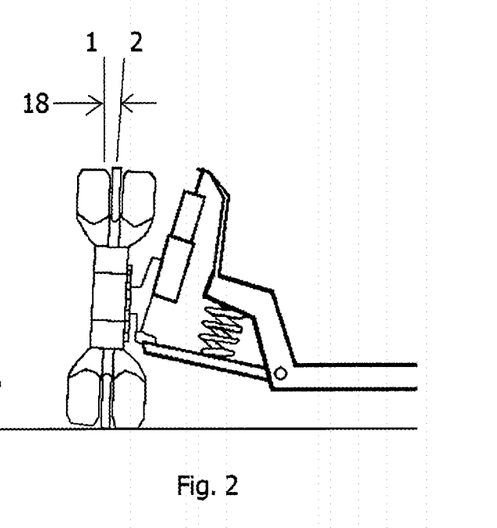
FIG. 2 is a cut-away view showing some degree of camber
Figure 3:
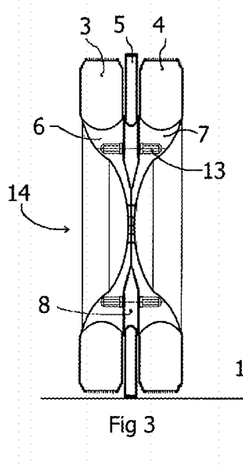
FIG. 3 is a cross-sectional view of the assembled invention
Figure 4:
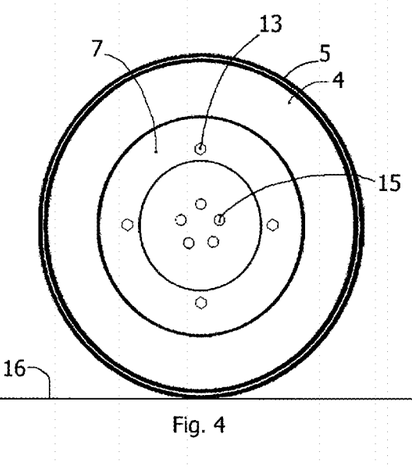
FIG. 4 is a side elevation view of the assembled invention

In order for the passive transfer aspect to perform properly with ample safety or tire traction, special care must be taken in the shape and design of the tires and rims. Large diameter tires must be specially shaped to yield the appropriate efficiency characteristics while also yielding the appropriate transition characteristics. Transition occurs when the vehicle is turning, resulting in a camber angle change. FIG. 1 and FIG. 2 show that camber is the angle 18 between the vertical axis of the TTAssembly 2 and the vertical axis of the vehicle 1 when viewed from the front or rear. Camber angle 18 is primarily used in the design of steering and suspension. When the steering wheel is turned causing the TTAssembly to turn, the camber angle 18 changes. This angle change will cause the small diameter tire to come into contact with the roadbed 16 when the angle is large enough. The larger the camber angle 18, the more this occurs. Transition can also occur during an emergency stop. During a panic or emergency stop the sudden stopping force on all of the large diameter tires in the TTAssemblies (both front and rear) will deform causing all twelve of the tires to contact the roadbed. See FIG. 10. This is especially critical for the front assemblies as 50% of the rear axle weight is typically transferred to the front assemblies during a sudden stop. As soon as the increased force is removed the large diameter tires will resume their previous shape and the vehicle will resume riding on only the large diameter tires. The vehicle will be most efficient when all hubs of the vehicle have the TTAssemblies installed on them. As is standard practice, each axle must have identical wheel assemblies.

As every vehicle will react differently based on its camber, turning radius, center of gravity and wheelbase a standard starting point would be to have the small diameter wheels to have a diameter of 28.9 inches and a width of 4 inches and the center large diameter tire to have a diameter of 30 inches and be 2 inches, wide. This instantiation produces a combined standard size tire width of 10 inches or 255 mm, which would easily replace a single tire/rim combo having a width of 255 mm. This is a standard size on many vehicles.

It is the perfect invention because no customization to the vehicle is required to use the TTAssembly, it saves gas, saves money, is easy to maintain and there is no need for a spare tire saving space and weight.

What is claimed is:

1. A multi-diameter wheel assembly for use on at least one hub of a vehicle, comprising:
   one larger diameter tire;
   one center rim;
   two identical small diameter tires;
   one inboard rim;
   one outboard rim;
   a rim connection means;
   a central longitudinal axis about which said wheel assembly rotates;
   wherein said large diameter tire is mounted and inflated onto said center rim forming a center wheel, and
   one of said two identical small diameter tires is mounted and inflated onto said inboard rim, and the other of said two identical small diameter tires is mounted and inflated onto said outboard rim forming inboard and outboard wheels, respectively;
   said inboard, center, and outboard rims are connected together in adjacent concentric fashion by said rim connection means so that said rims are aligned on said central longitudinal axis of said wheel assembly, said center wheel is sandwiched between said outboard wheel and said inboard wheel;
   said large diameter tire has an overall width less than that of either of said identical small diameter tires, and a footprint of said large diameter tire is configured to be in constant contact with a road surface during use of said vehicle;
   said wheel assembly only rides on said footprint of said large diameter tire as said vehicle travels in a straight line;
   a footprint of at least one of said small diameter tires is configured to be in contact with said road surface during turning or braking of said vehicle such that said wheel assembly passively transitions to ride on both said footprint of said large diameter tire and said footprint of said at least one of said small diameter tires.

* * * * *